(12) United States Patent
Katchmart (10) Patent No.: US 11,935,571 B1
(45) Date of Patent: *Mar. 19, 2024

(54) DUAL-SURFACE RRO WRITE IN A STORAGE DEVICE SERVO SYSTEM

(71) Applicant: Marvell Asia Pte Ltd, Singapore (SG)

(72) Inventor: Supaket Katchmart, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 18/066,394

(22) Filed: Dec. 15, 2022

Related U.S. Application Data (63) Continuation of application No. 17/647,036, filed on Jan. 5, 2022, now Pat. No. 11,557,320.

(60) Provisional application No. 63/141,441, filed on Jan. 25, 2021.

(51) Int. Cl.
  *G11B 5/596* (2006.01)

(52) U.S. Cl.
  CPC ...... *G11B 5/59627* (2013.01); *G11B 5/59666* (2013.01)

(58) Field of Classification Search
  None
  See application file for complete search history.

(56) References Cited

U.S. PATENT DOCUMENTS

| | | | |
|---|---|---|---|
| 6,249,393 B1 | 6/2001 | Billings et al. | |
| 6,775,091 B1 * | 8/2004 | Sutardja | G11B 5/59627 360/77.04 |
| 6,947,249 B1 * | 9/2005 | Hargarten | G11B 5/59627 360/77.07 |
| 7,106,542 B1 * | 9/2006 | Sun | G11B 5/59666 360/75 |
| 7,583,470 B1 * | 9/2009 | Chen | G11B 5/59627 360/77.06 |
| 7,773,328 B1 * | 8/2010 | Katchmart | G11B 5/59627 360/77.04 |
| 7,773,334 B1 * | 8/2010 | Rutherford | G11B 5/59633 360/75 |
| 7,961,422 B1 * | 6/2011 | Chen | G11B 5/59627 360/77.04 |
| 8,711,504 B1 | 4/2014 | Everett et al. | |
| 8,737,011 B1 * | 5/2014 | Buch | G11B 5/59627 360/77.02 |
| 8,767,341 B1 | 7/2014 | Coker et al. | |
| 8,934,186 B1 | 1/2015 | Guo et al. | |

(Continued)

*Primary Examiner* — Peter Vincent Agustin (57) ABSTRACT

A method for writing repeatable run-out (RRO) data, to surfaces of a rotating magnetic storage medium in a storage device having two read channels, includes detecting, with a first head, using a first read channel, a servo sync mark (SSM) on a first track on a first surface, establishing a recurring servo-gating signal at a successive fixed interval from the SSM, detecting, with the first head, servo signals from the first track on occurrence of the recurring servo-gating signal, processing the servo signals from the first track, to generate first positioning signals for positioning the first head relative to the first track, following a similar procedure with a second read channel having a second head to generate second positioning signals for the second read head, and writing first and second RRO data to servo wedges of the first and second tracks according to the respective positioning signals.

17 Claims, 9 Drawing Sheets

(56) References Cited

U.S. PATENT DOCUMENTS

| | | | |
|---|---|---|---|
| 9,053,728 B1 | 6/2015 | French, Jr. | |
| 9,129,630 B1* | 9/2015 | Guo | G11B 5/59655 |
| 9,502,062 B1* | 11/2016 | Dorobantu | G11B 5/59627 |
| 10,971,187 B2 | 4/2021 | Katchmart | |
| 11,557,320 B1* | 1/2023 | Katchmart | G11B 5/59627 |
| 2002/0089906 A1* | 7/2002 | Faucett | G11B 7/0953 |
| | | | 369/53.14 |
| 2005/0174672 A1 | 8/2005 | Kim | |
| 2007/0242387 A1 | 10/2007 | Kawabe | |
| 2008/0239554 A1 | 10/2008 | Takeda et al. | |
| 2009/0059420 A1* | 3/2009 | Melrose | G11B 5/59627 |
| | | | 360/77.04 |
| 2009/0168218 A1 | 7/2009 | Mizukoshi et al. | |
| 2009/0244759 A1* | 10/2009 | Mori | G11B 5/59638 |
| | | | 360/47 |
| 2011/0051286 A1* | 3/2011 | Pokharel | G11B 5/855 |
| 2012/0147495 A1* | 6/2012 | Sutardja | G11B 5/59627 |
| | | | 360/77.03 |
| 2018/0144764 A1* | 5/2018 | Trantham | G11B 5/4886 |

* cited by examiner

| Data | | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| 601 | Time Stamp | 1000 | 2000.5 | 3000.5 | 4001 | 5001 | 6001 | 7001.5 | 8001.5 | 9001.5 | 10001.5 | 11002 | 12002 | 13002 | 14002 | 15002 | 16002 | 17002 |
| 602 | Typical DSW TS Delta | N/A | 1000.5 | 1000 | 1000.5 | 1000 | 1000 | 1000.5 | 1000 | 1000 | 1000 | 1000.5 | 1000 | 1000 | 1000 | 1000 | 1000 | 1000 |
| 603 | Error | N/A | 0.5 | 0 | 0.5 | 0 | 0 | 0.5 | 0 | 0 | 0 | 0.5 | 0 | 0 | 0 | 0 | 0 | 0 |
| 604 | New DSW TS Target | N/A | 2000 | 3000 | 4000 | 5000 | 6000 | 7000 | 8000 | 9000 | 10000 | 11000 | 12000 | 13000 | 14000 | 15000 | 16000 | 17000 |
| 605 | Error | N/A | 0.5 | 0.5 | 1 | 1 | 1 | 1.5 | 1.5 | 1.5 | 1.5 | 2 | 2 | 2 | 2 | 2 | 2 | 2 |

Wedge (NWCNTR+1)

DUAL-SURFACE RRO WRITE IN A STORAGE DEVICE SERVO SYSTEM

CROSS REFERENCE TO RELATED APPLICATIONS

This is a continuation of commonly-assigned U.S. patent application Ser. No. 17/647,036, filed Jan. 5, 2022 (now U.S. Pat. No. 11,557,320), which claims the benefit of, and was with, commonly-assigned U.S. Provisional Patent Application No. 63/141,441, filed Jan. 25, 2021, each of which is hereby incorporated by reference herein in its respective entirety.

FIELD OF USE

This disclosure relates to write operations for a repeatable run-out (RRO) field in storage devices such as disk drives. More particularly, this disclosure relates to the timing of RRO-write operations on two surfaces of a multi-surface storage device.

BACKGROUND

The background description provided herein is for the purpose of generally presenting the context of the disclosure. Work of the inventors hereof, to the extent that that work is described in this background section, as well as aspects of the description that may not otherwise qualify as prior art at the time of filing, are neither expressly nor impliedly admitted to be prior art against the subject matter of the present disclosure.

In magnetic recording, as one example, reading and writing are performed by one or more heads that move relative to the surface of a storage medium. Magnetic disk drives, for example, include a one or more individual disks, or "platters," which may be two-sided—i.e., each platter can store data on each of its two sides. Therefore, such a disk drive would have at least two heads for each platter. Indeed, for each platter, there is normally at least one write head and at least one separate read head, so that such a disk drive normally has at least four heads per platter.

In a common configuration, all of the heads in a given disk drive may be mounted on arms attached to a common actuator that controls the radial position of the heads (an angular, tangential or circumferential component of motion is provided by the rotation of the platters relative to the heads). This is true whether there is one or many platters, and one or multiple heads per platter. In alternative configurations, there may be multiple (e.g., two) actuators, each of which bears multiple arms, of which all normally carry respective read and write heads.

In order to control the radial position selected by the actuator, each surface of each platter has distributed upon it positional information referred to as "servo" data. The servo data are commonly distributed in spaced-apart servo "wedges" (generally spaced equiangularly) on the platter surface. By reading the servo data as each servo wedge passes under the read head, the disk drive controller can determine the precise radial (and angular) position of the head and can feed back that determination to control the position of the read head or the write head, depending on the required operation. One component of servo data is a "repeatable run-out," or RRO, field, which characterizes repeatable contributions to error, so that it can be factored into position determinations.

Servo wedge information typically is recorded on a storage medium at the time of manufacture. One technique for recording servo wedge information is "self-servo write" ("SSW"), in which the storage device's own read/write mechanisms, including data channel controllers and read/write heads, are used to write the servo wedge information, possibly under control of an external processor.

Self-servo-write operations typically begin with writing of initial or "coarse" reference spirals. The coarse reference spirals are sets of time data written in highly ramped spirals between the outer and inner diameter of the disk by sweeping the disk read/write head radially at a relatively high rate as the disk rotates. The coarse reference spirals may not be regularly or evenly spaced. After coarse reference spirals have been written, the read/write mechanism reads and "learns" the locations of the coarse reference spirals. The coarse reference spiral locations are then referenced to allow the writing of more refined location data as "intermediate" reference spirals. The intermediate reference spirals are less ramped than the coarse spirals and contain more precise time data. After the intermediate spirals have been written, the read/write mechanism reads and "learns" the locations of the intermediate spirals. From this finer location data, the read/write mechanism writes final servo control signal patterns as "servo wedges" along concentric arcs at varying radii (i.e., in tracks).

The quality of the spiral data and the servo wedge data is affected by the frequency at which the spiral data and the servo wedge data are processed. In typical implementations, both the spiral data and the servo wedge data are processed at frequencies derived from a common reference frequency, but using separate time base generators.

After the self-servo write operations, the aforementioned RRO data also must be written to each servo wedge.

As described, self-servo-write operations and RRO-write operations each utilize both the read-data channel (RDC) and the write-data channel (WDC) of a disk drive, and both the RDC and the WDC are typically limited to operating on only one disk surface at any one time. In a typical disk drive having multiple platters, each with hundreds of thousands of tracks, but only one RDC and one WDC, self-servo-write and RRO-write operations may require days or weeks to complete, adding to the time and cost of manufacturing the disk drive. Indeed, up to 40% of the time required to manufacture a high-performance disk drive is consumed by the self-servo-write and RRO-write processes.

SUMMARY

According to implementations of the subject matter of this disclosure, a method for writing repeatable run-out data, representing a recurring contribution to position error, to multiple surfaces of a rotating magnetic storage medium in a storage device having two read channels, includes detecting, with a first read head of the storage device, using a first read channel, a servo sync mark on a first track on a first storage medium surface of the storage device, establishing a first recurring servo-gating signal for the first read channel at a successive fixed interval from the servo sync mark, detecting, with the first read head, servo signals from the first track on occurrence of the first recurring servo-gating signal, processing the servo signals from the first track, to generate first positioning signals for positioning the first read head relative to the first track for writing first repeatable run-out data, establishing a second recurring servo-gating signal for a second read channel at an offset from the first recurring servo-gating signal, detecting, with a second read head, servo signals from a second track on occurrence of the second recurring servo-gating signal, processing the servo signals from the second track, to generate second positioning signals for positioning the second read head relative to the second track for writing second repeatable run-out data, and writing first repeatable run-out data to servo wedges of the first track according to the first positioning signals, and second repeatable run-out data to servo wedges of the second track according to the second positioning signals, using a single write data channel of the storage device.

In a first implementation of such a method, processing the servo signals from the first track may include processing the servo signals from the first track in a storage device controller separate from the storage device, and processing the servo signals from the second track may include processing the servo signals from the second track in servo writing circuitry of the storage device.

According to a first aspect of that first implementation, establishing the first recurring servo-gating signal for the first read channel may be performed using the storage device controller separate from the storage device, and establishing the second recurring servo-gating signal for the second read channel may be performed using the servo writing circuitry of the storage device.

A first instance of that first aspect of the first implementation may further include storing the first positioning signals and the second positioning signals, prior to the writing, in memory in the servo writing circuitry of the storage device.

A first variant of that first instance of the first aspect of the first implementation may claim 4 further include issuing respective first and second fetch commands from the servo writing circuitry to respectively fetch the first positioning signals and the second positioning signals from the memory.

In a second implementation of such a method, writing the first repeatable run-out signals to servo wedges of the first track according to the first positioning signals, and the second repeatable run-out signals to servo wedges of the second track according to the second positioning signals, using a single write data channel of the storage device, may include temporally interleaving writing the first repeatable run-out signals to servo wedges of the first track with writing the second repeatable run-out signals to servo wedges of the second track.

In a third implementation of such a method, establishing the first recurring servo-gating signal for the first read channel at the successive fixed interval from the initial servo sync mark may include setting the fixed interval based on rotation speed of the rotating magnetic storage medium.

According to a first aspect of that third implementation, the method may further include locking the fixed interval to the rotation speed of the rotating magnetic storage medium.

In a first instance of that first aspect of the third implementation, locking the fixed interval to the rotation speed of the rotating magnetic storage medium may include setting a counter as a timer of the fixed interval, marking a time difference between a selected position of the counter and the servo sync mark, periodically checking that the time difference between the selected position of the counter and the servo sync mark has not changed, and when the time difference between the selected position of the counter and the servo sync mark has changed, adjusting a clock source of the rotating magnetic storage medium.

In a first variant of that first instance of the first aspect of the third implementation, periodically checking may include checking once during each servo wedge.

A data storage system according to implementations of the subject matter of this disclosure includes a storage device, and a storage controller separate from the storage device, wherein the storage device includes a storage medium, having multiple storage medium surfaces on which servo data is written, the servo data on each storage medium surface including a repeatable run-out field representing a recurring contribution to position error, and circuitry for writing the repeatable run-out field. The circuitry includes a first read channel, a second read channel, a first detector on a first read head of the storage device, the first detector being configured to detect data, including a servo sync mark, on a first track on a first storage medium surface of the storage device, and a second detector on a second read head of the storage device, the second detector being configured to detect data on a second track on a second storage medium surface of the storage device. The system is configured to establish a first recurring servo-gating signal for the first read channel at a successive fixed interval from the servo sync mark, the detector on the first read head being configured to detect servo signals from the first track on occurrence of the first recurring servo-gating signal, process the servo signals from the first track, to generate first positioning signals for positioning the first read head relative to the first track for writing first repeatable run-out data, establish a second recurring servo-gating signal for the second read channel at an offset from the first recurring servo-gating signal, detect, with the second detector on the second read head, servo signals from the second track on occurrence of the second recurring servo-gating signal, process the servo signals from the second track, to generate second positioning signals for positioning the second read head relative to the second track for writing second repeatable run-out data, and write the first repeatable run-out data to servo wedges of the first track according to the first positioning signals, and the second repeatable run-out signals to servo wedges of the second track according to the second positioning signals, using a single write data channel of the storage device.

In a first implementation of such a data storage system, the system may be configured to process the servo signals from the first track by processing the servo signals from the first track in a storage device controller separate from the storage device, and process the servo signals from the second track by processing the servo signals from the second track in servo writing circuitry of the storage device.

According to a first aspect of that first implementation, the storage device controller separate from the storage device may be configured to establish the first recurring servo-gating signal for the first read channel, and the servo writing circuitry of the storage device may be configured to establish the second recurring servo-gating signal for the second read channel.

A first instance of that first aspect of the first implementation may further include memory in the servo writing circuitry of the storage device, the memory being configured to store the first positioning signals and the second positioning signals, prior to writing the first positioning signals to servo wedges of the first track and the second positioning signals to servo wedges of the second track.

In a first variant of that first instance of the first aspect of the first implementation, the servo writing circuitry may be configured to issue respective first and second fetch commands from the servo writing circuitry to respectively fetch the first positioning signals and the second positioning signals from the memory.

In a second implementation of such a data storage system, the system may be configured to write the first repeatable run-out signals to servo wedges of the first track according to the first positioning data, and the second repeatable run-out signals to servo wedges of the second track according to the second positioning data, using a single write data channel of the storage device, by temporally interleaving writing the first repeatable run-out signals to servo wedges of the first track with writing the second repeatable run-out signals to servo wedges of the second track.

In a third implementation of such a data storage system the system may be configured to establish the first recurring servo-gating signal for the first read channel at the successive fixed interval from the initial servo sync mark by setting the fixed interval based on rotation speed of the rotating magnetic storage medium.

According to a first aspect of that third implementation, the data storage system may be configured to lock the fixed interval to the rotation speed of the rotating magnetic storage medium.

In a first instance of that first aspect of the third implementation, the system may be configured to lock the fixed interval to the rotation speed of the rotating magnetic storage medium by setting a counter as a timer of the fixed interval, marking a time difference between a selected position of the counter and the servo sync mark, periodically checking that the time difference between the selected position of the counter and the servo sync mark has not changed, and when the time difference between the selected position of the counter and the servo sync mark has changed, adjusting a clock source of the rotating magnetic storage medium.

In a first variant of that first instance of the first aspect of the third implementation, the system may be configured to periodically check that the time difference between the selected position of the counter and the servo sync mark has not changed by checking once during each servo wedge.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

As noted above, self-servo-write and RRO-write operations utilize both the read-data channel (RDC) and the write-data channel (WDC) of a disk drive, and both the RDC and the WDC are typically limited to operating on only one disk surface at any one time. A typical disk drive has multiple two-sided platters, each with hundreds of thousands of tracks (e.g., 200,000-400,000 tracks), but only one RDC and one WDC. In such disk drives, self-servo-write and RRO-write operations may require days or weeks to complete, adding to the time and cost of manufacturing the disk drive.

The time required to complete self-servo-write and RRO-write operations can be reduced by increasing the number of RDCs and WDCs in the disk drive. However, adding an RDC or a WDC is expensive. Nevertheless, recently disk drives have been developed that use two-dimensional magnetic recording (TDMR), and those disk drives include a second RDC (but only one WDC).

Therefore, in accordance with implementations of the subject matter of this disclosure, the time required to complete self-servo-write and RRO-write operations can be nearly halved for disk drives equipped for TDMR, by using both RDCs so that self-servo write operations, including RRO write operations, can be carried out concurrently on two different disk surfaces (which can be two sides of the same disk platter, or surfaces on two different disk platters).

Although a plurality of the read/write arms carrying the read/write heads of a disk drive assembly may be mounted on a single actuator and therefore theoretically move together to the same location over every disk platter surface, in practice vibrations and inertial forces may cause different ones of the read/write arms borne by a single actuator to move to slightly different locations. This may give rise to at least two difficulties in writing the RRO field to the two different surfaces.

First, the position of the actuator is determined by servo data read by one of the actuators from one surface (which may be considered the "primary" surface), while the head position relative to a second surface (which may be considered the "secondary" surface) may be slightly different. This difficulty may be mitigated by providing, in disk drives with which the subject matter of this disclosure is used, not only two RDCs, but also micro-actuators at the end of each read/write arm. That is, in addition to each read/write arm pivoting about a main pivot point defined by the aforementioned actuator, each read/write arm should be articulated near its tip, so that the tip can be rotated about a second pivot point to fine-tune the location of the heads.

In implementations of the subject matter of this disclosure, the read head on one arm is locked to the servo signal (which will have been written earlier using, e.g., self-servo-write operations) of a track on its corresponding surface, which may be considered to be the "primary" surface for the RRO-write operation. On a second surface on which the RRO-write operation is to be carried out concurrently, the micro-actuator of the arm for that surface is used to move the head, if necessary, radially so that it too may be locked to the servo signal of its respective track. With the heads on both surfaces aligned to their respective tracks, the write channel can be used to write the RRO pattern to each respective track on each respective surface.

However, because the micro-actuator motion is rotational, it includes not only a radial or cross-track component of motion for positioning the head properly over the track, but also a circumferential or angular component that moves the head in a down-track direction (i.e., along the track). Therefore, the two heads may be in slightly different down-track positions and a phase differential may arise between the RRO patterns being written on the two separate surfaces. Accordingly, in some implementations, the amount of rotation of the respective micro-actuator on each of the two arms involved in RRO writing of a particular pair of surfaces may be kept track of, so that the amount of down-track differential can be computed and appropriate compensation can be applied.

Although the micro-actuators on both arms involved in RRO writing of a particular pair of surfaces may be adjusted, in a simplification in some implementations of the subject matter of this disclosure, one arm may be kept straight (i.e., the centerline of the micro-actuator is maintained in alignment with the centerline of the main arm), with the micro-actuator on only the other arm being used to adjust the cross-track position of the corresponding head. This may simplify the calculation of the down-track differential.

The down-track phase differential may be only one component of a timing difference between the two surfaces. Normally, each servo channel has its own clock, and therefore the time bases for RRO writing to the two surfaces are different. In accordance with implementations of the subject matter of this disclosure, the writing of servo data, including RRO data, to the two different surfaces may be accomplished by toggling the WDC between writing to a first surface and writing to a second surface. Because each writing operation can be accomplished in substantially less time than the time needed for processing the servo data in the read channel to determine where to write the RRO data (normally this would be expected to be accomplished well within one wedge-to-wedge interval), the toggling of the write operation between two different heads does not slow down the operation of the storage device. However, adjustments are made to accommodate the different time bases for the different surfaces, because the single WDC operates according to only one of the time bases.

The subject matter of this disclosure may be better understood by reference to FIGS. 1-10.

Figure 1:
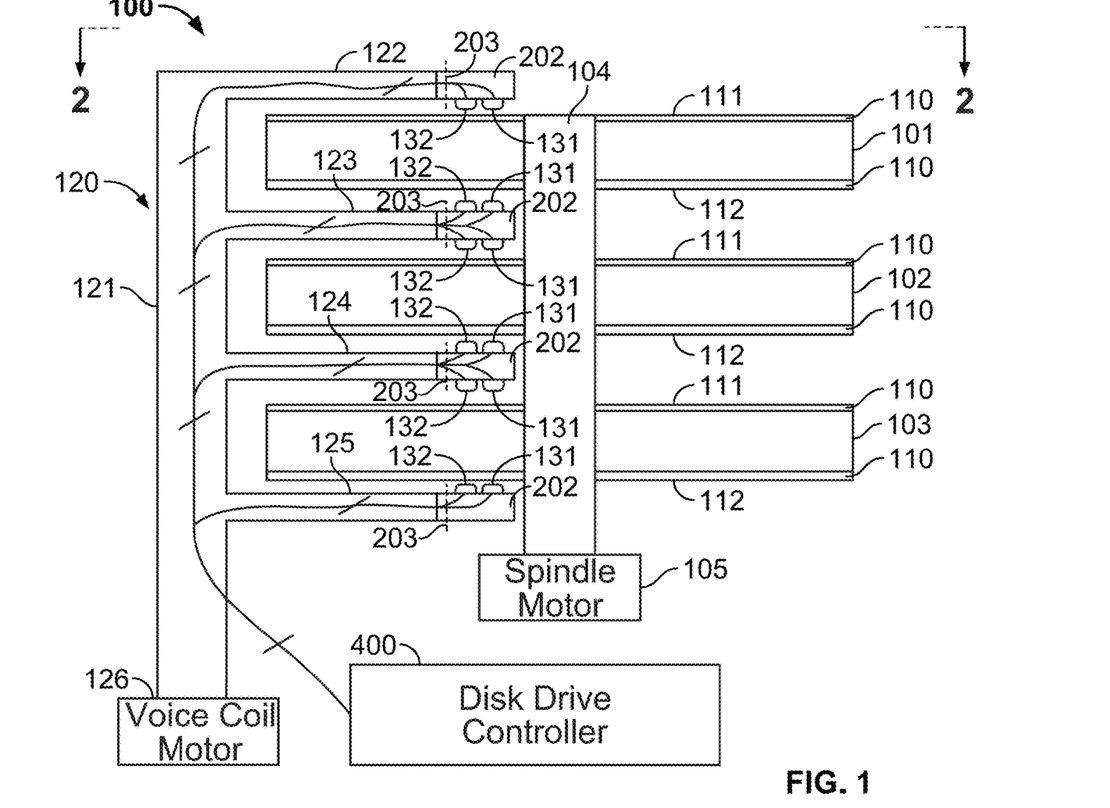
FIGS. 1 and 2 show a disk drive as an example of a storage device which may incorporate the subject matter of this disclosure.
Figure 2:
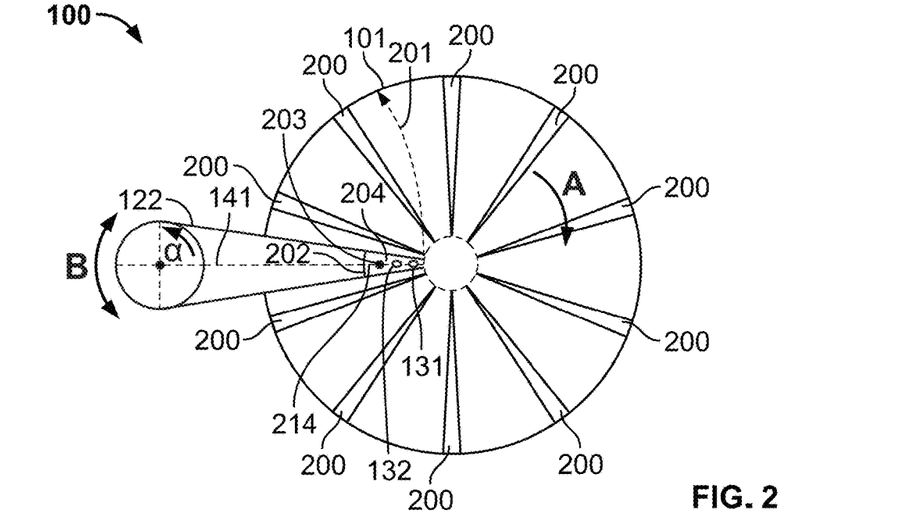

FIGS. 1 and 2 show a disk drive 100 as an example of a storage device with which the subject matter of the present disclosure may be used. In this particular example, disk drive 100 has three platters 101, 102, 103, although any number of platters may be included in a disk drive with which the subject matter of the present disclosure may be used. As shown, each platter 101, 102, 103 has, on each of its upper and lower surfaces 111, 112, a coating 110 made from a material in which data can be stored, e.g., magnetically. The present disclosure also is relevant to a disk drive in which one or more platters includes coating 110 on only one of its surfaces, but such a disk drive would store less data in the same volume than a disk drive with two-sided platters. The platters 101-103 are mounted on a rotatable spindle 104. Motor 105 rotates spindle 104 to rotate platters 101-103 in the direction of arrow A (FIG. 2). Although motor 105 is shown connected directly to spindle 104, in some cases motor 105 may be located off-axis of spindle 104 and would be connected to spindle 104 through belts or gears (not shown).

Read/write head assembly 120 includes at least one actuator 121 that bears arms 122-125, one of which is disposed adjacent to each surface 111, 112 of a platter 101, 102, 103 that has a memory storage coating 110. In this example, with heads on both surfaces of each of arms 123, 124, that amounts to four arms 122-125, but in the single-sided platter example discussed above, there would be only three arms. In other examples, the number of arms would increase or decrease along with the number of platters, although in some examples the arms may be distributed among more than one actuator.

Each arm 122-125 bears, at or near its end furthest from actuator 121, and on both its upper and lower surfaces in the case of arms 123, 124, a plurality of read heads/sensors and write heads. In this case, two sensors 131, 132 are shown, and may represent, respectively, read heads/sensors and write heads, although it in some applications each arm 123, 124 may bear more than one read head/sensor and more than one write head (not shown). In the configuration shown in FIGS. 1 and 2, arms 122-125 are aligned along a radius of platters 101-103, bringing heads 131, 132 as close as they can get to spindle 104. It is noted that FIGS. 1 and 2 are schematic only and not to scale. Normally, the spindle diameter would be larger relative to the disk diameter. Moreover, arms 122-125 normally cannot point directly at the center of the disk.

A motor 126, commonly referred to as a "voice-coil motor," rotates actuator 121 back and forth along the directions of arrow B (FIG. 2) to move the heads 131, 132 along the path indicated by dashed arrow 201. The motion of actuator 121 thus changes both the radial and circumferential positions of heads 131, 132, but the circumferential positional change is relatively unimportant insofar as the platters are rotating. The motion of actuator 121 thus is used to control the radial position of heads 131, 132.

The location on surface 111 of platter 101 (the other surfaces are similar) of the aforementioned wedges is shown in FIG. 2. Each servo wedge 200 includes data identifying it by wedge index, track index, or sector number (to give an angular, tangential or circumferential position) and by data representing, at each point along a radius of the platter, the distance from spindle 104.

The tip of each arm 122-125 may include a micro-actuator 202 (FIG. 2). That is, in addition to the pivot point of actuator 121, a second pivot point 203 may allow the tip 204 of arm 122-125 to be rotated relative to arm 122-125 so that the centerline 214 of tip 204 is no longer collinear with the centerline 141 of the arm 122-125. A motor (not shown) similar to voice-coil motor 126 may control the micro-actuator rotation. The size of micro-actuator 202 is exaggeration in FIG. 2. Normally, micro-actuator 202 will be proportionally much smaller than the main body of arm 122-125.

Figure 3:
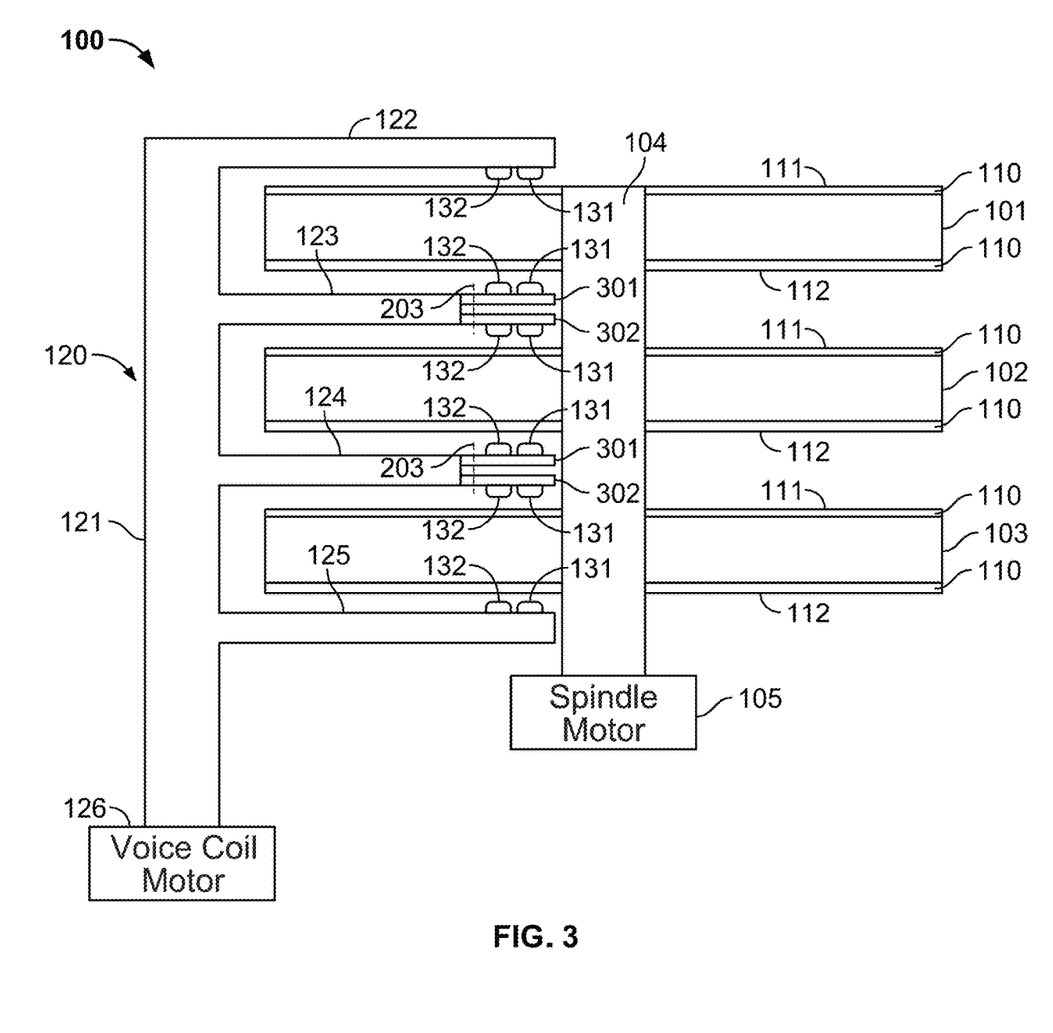
FIG. 3 is a view similar to FIG. 1 showing a disk drive having arms with two micro-actuators.

If a particular one of arms 122-125 is between two disk platters and has heads on its upper and lower surface for reading from and writing to the respective lower and upper surfaces of two different platters, there may be two separate micro actuators 301, 302 as shown in FIG. 3 (disk drive controller 400 is omitted from FIG. 3 to avoid cluttering the drawing). Again, the sizes of micro-actuators 301, 302 are exaggerated relative to the main bodies of the respective arms 122-125.

Figure 4:
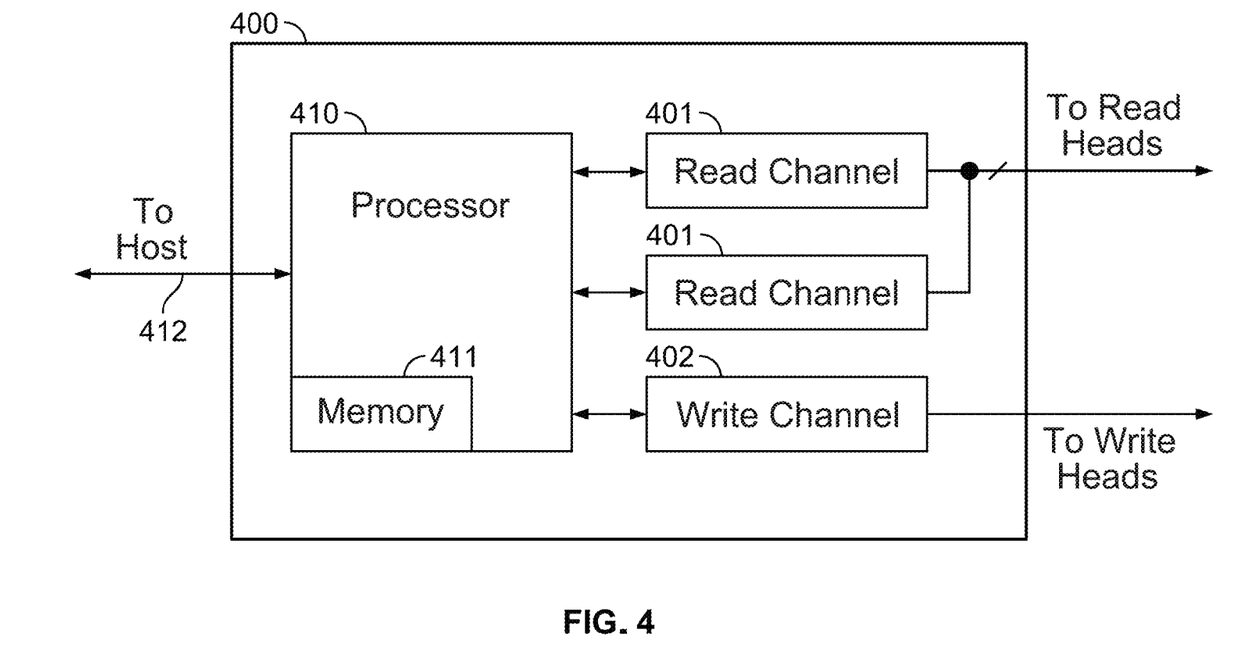
FIG. 4 is a schematic representation of a hard-drive controller which may incorporate the subject matter of this disclosure.

Each of read heads 131, 132 is connected to one of a pair of read channels 401 of a hard drive controller 400 (there is a corresponding write channel 402) (FIG. 4). Hard drive controller 400 also includes a processor 410 and memory 411, as well as a connection 412 to a host processor (not shown). During normal disk operation, memory 411 may be used to store position error sensor (PES) data that indicates track position offsets. A servo control loop in hard drive controller 400 uses the PES data and the servo wedge data to keep the heads 131, 132 on track.

As part of the drive manufacturing process, or later but before first use of the drive, servo data may be written to servo wedges 200 on each surface of each platter using, e.g., the self-servo-write process described in commonly-assigned U.S. Pat. No. 10,971,187, which is hereby incorporated by reference herein in its entirety. As noted above, the availability of two RDCs in a drive equipped for TDMR allows the self-servo-write process to be performed on two disk surfaces at the same time, by allowing reading of servo spiral data from both surfaces at the same time. The single WDC can operate according to only one of the time bases, and implementations of the subject matter of this disclosure may be used to lock the timing of the time base of the WDC to the rotation of disk 101/102/103.

Self-servo-write operations may be followed by RRO-write operations, in which RRO data is written based on timing derived from concentric servo data written during the self-servo-write operations, as determined by the hard drive controller. For example, each cycle may begin with a servo-gating (SGATE) signal that is based on detection of a servo-sync-mark-found (SSMF) signal. However, in a dual-surface operation, after detection of SSMF and generation of an SGATE signal for a first (i.e., primary) surface, detection of SSMF for a secondary surface may occur too quickly for processing by the hard drive controller to generate an SGATE signal for the secondary surface.

The RRO data to be written is derived based on phase/timing/amplitude discrepancies relative to the head radial position based on the concentric servo data (e.g., the PES field) that was written during the self-servo-write operation. However, in a dual-surface implementation, the hard drive controller may be unable to demodulate the servo data to derive positioning data for the RRO fields from two surfaces within one cycle.

Therefore, according to implementations of the subject matter of this disclosure, an SGATE signal for the secondary surface may be generated internally to the self-servo-write circuitry, rather than in the hard drive controller. And the demodulated runout positioning data is stored in the servo memory SMEM, rather than in memory in (or controlled by) the hard drive controller. Accordingly, the subject matter of this disclosure is compatible with existing hard drive controllers.

In accordance with implementations of the subject matter of this disclosure, in a dual-surface RRO writing system the two surfaces are treated differently. One surface may be designated the primary surface. RRO writing on the primary surface is performed normally, reading the concentric servo data through one of read channels 401 to determine the runout data and to find SSMF to trigger SGATE. For the secondary surface, SGATE is generated by the self-servo-write system in the drive (rather than in the hard drive controller)—e.g., a certain amount of time after SGATE for the primary surface—and similarly the demodulated servo data that is read from the secondary surface through another of the read channels 401 is stored in SMEM 568 and is fetched from SMEM 568 upon completion of demodulation of the servo data from the primary surface. For writing of the RRO data to the primary and secondary surfaces, the single write data channel may be toggled between the write head for the primary surface and the write head for the secondary surface.

Figure 5:
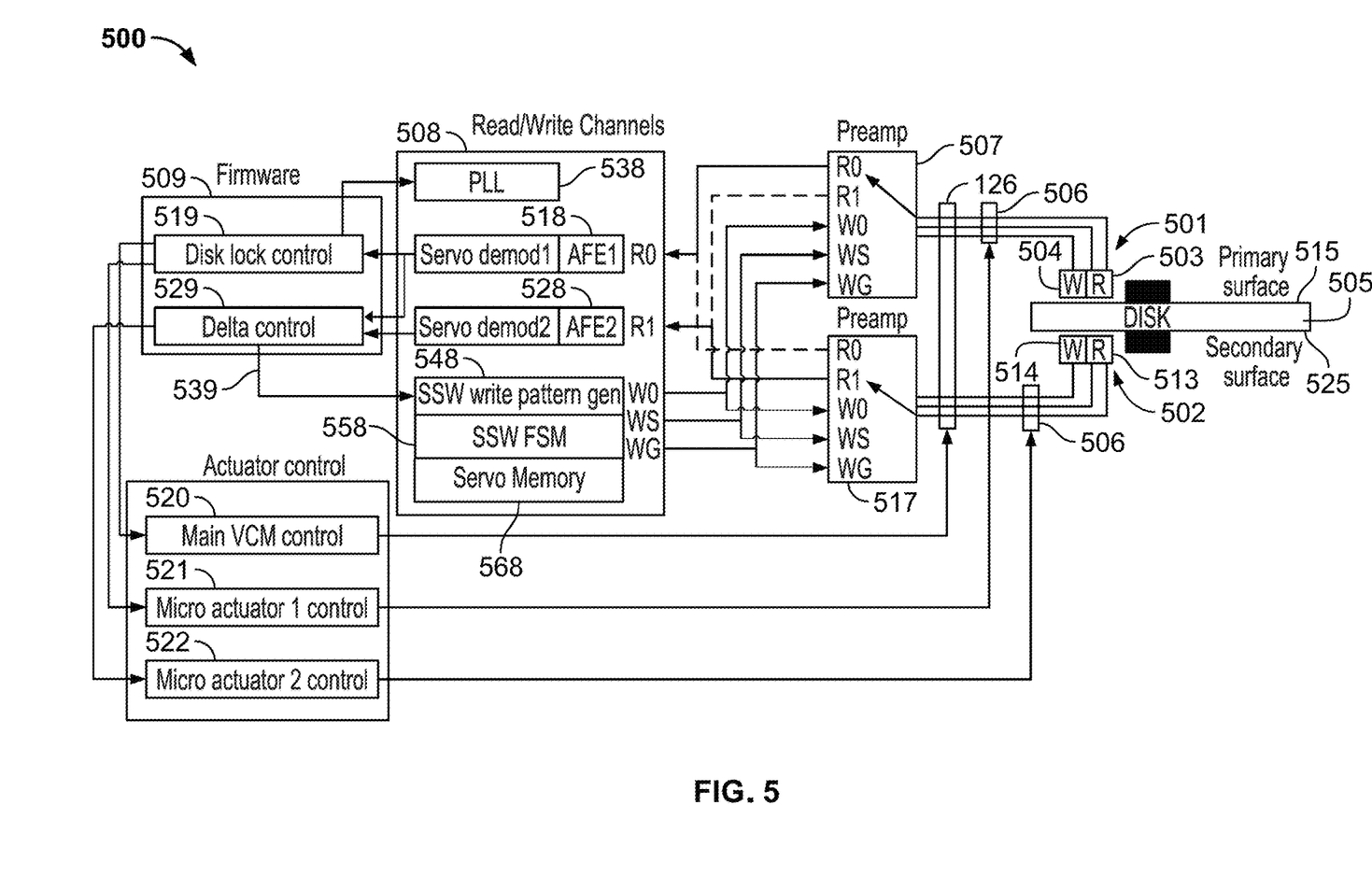
FIG. 5 is a diagram of a storage device control system according to implementations of the subject matter of this disclosure.

FIG. 5 is a diagram of a control system 500 according to implementations of the subject matter of this disclosure. Control system 500 reads servo data from two disk surfaces, keeps track of read and write head positions, and controls toggling of the write data channel to write to each of the two disk surfaces.

FIG. 5 depicts control system 500 as being coupled to two sets 501, 502 of read and write heads, each including a respective read head 503, 513 and a respective write head 504, 514. As depicted, the two sets 501, 502 of read/write heads serve opposing surfaces 515, 525 of a single disk platter 505. However, that is only an example, and control system 500 can be used to process any two surfaces in a multi-platter disk drive, even on different disk platters.

In addition to processing read and write signals in the manner described below, control system 500 also controls the movement of the read/write heads 501, 502. Specifically, control system 500 controls voice coil motor 126 (shown here schematically) which moves all heads at once as described above, as well as individual micro-actuator control motors 506 (shown here schematically), each respective one of which fine tunes the head positions on a respective single arm by moving a respective individual one of micro-actuators 202 (not shown in FIG. 5) on the respective arm.

As shown in FIG. 5, control system 500 includes a respective preamplifier 507, 517 interfaced with each respective set 501, 502 of read/write heads. Control system 500 may include as many preamplifiers (not shown) as there are sets of read/write heads (i.e., as many preamplifiers as there are disk surfaces) in the disk drive being controlled. Alternatively, because there are only two RDCs in the disk drive, there may be only two preamplifiers 507, 517, shared by all of the sets of read/write heads in the disk drive by using, e.g., multiplexers (not shown) to selectively couple the read/write heads to the preamplifiers.

Each respective preamplifier 507, 517 is capable of directing signals from its respective read head 503, 513 to either one of Read Data Channel 0 (R0) 518 or Read Data Channel 1 (R1) 528 in read/write control unit 508. The disk surface corresponding to one of read heads 503, 513 is designated the "primary" surface. The selection of which of the two disk surfaces is "primary" may be arbitrary. One of the two read channels 518, 528, to which the surface designated as "primary" is coupled, is used to demodulate the servo signal from the primary surface. The output of the demodulation of the primary surface servo signal is used to lock the counters (not shown), which are used for timing in the self-servo-write system, to the disk rotation by adjusting a frequency generator in read/write control unit 508 to match the disk rotation frequency. For example, as shown, a phase-locked loop (PLL) 538 may be used as the frequency generator.

Disk lock control 519, which may be implemented, for example, in firmware 509, may use the primary surface servo signal as described below in connection with FIG. 6, to control the frequency of PLL 538, which can be used to adjust rotational velocity of storage media of the storage device. Disk lock control 519 may also use the primary surface servo signal to command main voice-coil motor control 520 to keep the radial position of the read head (503 or 513), that is used for the primary surface, aligned with the data track being processed.

The other one of read heads 503, 513—i.e., the read head that is not being used for the primary surface—is used for the secondary surface, and the secondary surface servo signal from that other one of read head 503, 513 is directed by the respective one of preamplifiers 507, 517 to the other one of read channels 518, 528—i.e., the one that is not coupled to the primary surface servo signal. In the implementation seen in FIG. 5, the primary surface is coupled by preamplifier 507 to read channel 518, while the secondary surface is coupled by preamplifier 517 to read channel 528.

The output of the demodulation of the secondary surface servo signal—e.g., the output of read channel 528 in the implementation shown in FIG. 5—is used by "delta control" 529 to command micro-actuator-2 control 522 to keep the secondary surface read head aligned with the track being read. The outputs of both read channels 518, 528 may be used by delta control 529 to determine any phase differential in the primary surface signal between successive passes, and in the secondary surface signal between successive passes.

With regard to head positioning, normally it may be sufficient to keep the micro-actuator of the arm carrying the primary read head (that micro-actuator is controlled by micro-actuator-1 control 521) in a neutral position (i.e., a position aligned with the main body of that arm). However, in some situations it may be necessary to adjust the micro-actuators of both heads, using micro-actuator-1 control 521 and micro-actuator-2 control 522, to maintain both heads over their respective tracks.

As noted above, the output of delta control 529 also is used to determine any phase differential in the primary surface signal between successive passes, and in the secondary surface signal between successive passes. As described in the preceding paragraph, normally the micro-actuator for the head on the primary surface is kept in a neutral position and the micro-actuator is moved only for the head on the secondary surface, meaning that normally a phase differential will occur between passes only for the secondary surface. However, if, as noted in the preceding paragraph, both micro-actuators are moved to keep both heads over their respective tracks, respective phase differentials may occur between passes for both the primary surface and the secondary surface. In any case, the result 539 of the determination of a phase differential by delta control 529 for either surface may be used by self-servo-write pattern generator 548 (in this implementation, part of self-servo-write finite state machine 558) to adjust the self-servo-write pattern for the that surface to account for that phase differential, as described, for example, in above-incorporated commonly-assigned U.S. Pat. No. 10,971,187.

Because of the importance of timing in these second implementations, control of the disk rotational frequency (disk synchronous write, or DSW, control) also is important. Typical DSW control measures the intervals between successive servo sync marks and uses feedback to control, e.g., a phased-lock loop to maintain constant disk rotational frequency. Because such a typical DSW approach looks only at the interval between the current servo sync mark and the immediately preceding servo sync mark, and only makes a correction when the interval deviates from the expected interval by more than a predetermined threshold, small errors—each too small by itself to meet the threshold for correction—can accumulate, but will never be detected.

Therefore, in accordance with implementations of the subject matter of this disclosure, an improved DSW control technique, which may be used in, e.g., disk lock control 519 (see above) compares the time of detection of the current servo sync mark not to the previous servo sync mark, but to the expected time of occurrence of the current servo sync mark, based on the time of occurrence of the initial servo sync mark when the system is initialized, the expected interval between successive servo sync marks, and the number of intervals that have passed since the initial servo sync mark. According to such a technique, once one servo sync mark is detected at a time other than the expected time, each subsequent servo sync mark—even if each is detected at precisely the expected interval from the previous sync mark—will deviate from its expected time by that same amount. And if multiple servo sync marks deviate from the expected interval by a small amount (below the detection threshold of the typical technique described above), then eventually the accumulated error will be detected, and corrective action—e.g., adjusting the time base generator such as a phase-locked loop, or adjusting the disk angular velocity, or both—can be taken.

WCNTR is a wedge timer or counter that, at the beginning of each servo wedge, resets to '0' and counts up until a next servo wedge is detected (or, optionally, until an adjustable limit is reached). An additional counter, NWCNTR, counts the number of wedges (i.e., increments by '1' each time a servo wedge is detected), optionally resetting when an adjustable limit, such as the maximum number of servo wedges on the disk, is reached. For n servo wedges, NWCNTR would count from 0 to n−1.

Figure 6:
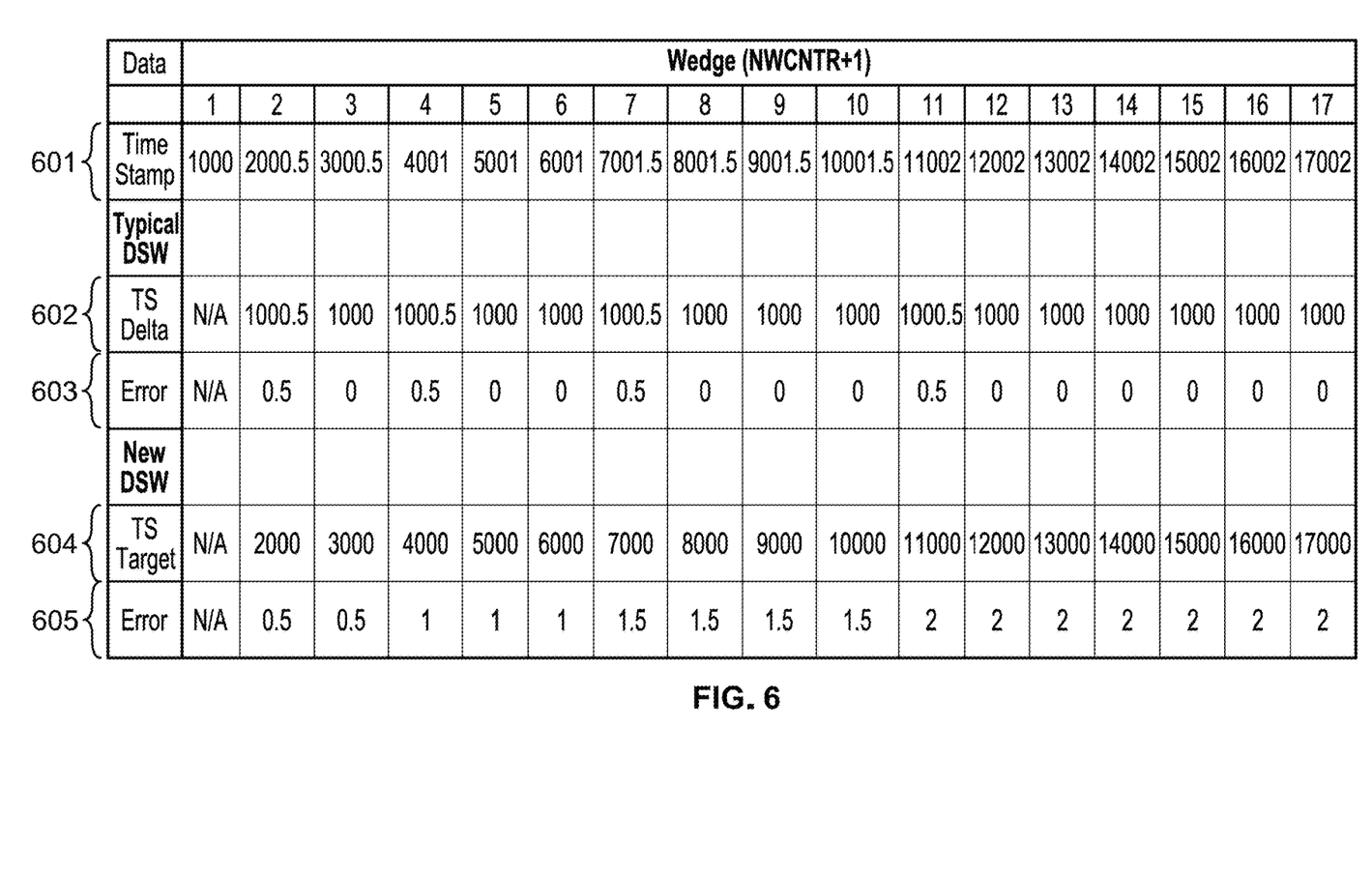
FIG. 6 is a table comparing a frequency control technique, according to implementations of the subject of this disclosure, to a typical frequency technique.

The difference between a typical DSW technique and the DSW technique described above ("New DSW") may be seen in the table in FIG. 6, which compares the two techniques over 17 servo wedges (NWCNTR=0, . . . , 16), and assumes that the target wedge-to-wedge (i.e., SSM-to-SSM) interval is 1000 time units. Row 601 shows the actual timestamp of the SSM detection events (SSMF), with the first wedge being detected at t=1000.

Row 604 shows the target SSMF timestamps based on that initial SSMF at t=1000. With a target interval of 1000 time units, the target timestamps for the second through seventeenth wedges are 2000, 3000, 4000, . . . , 17000. As seen on row 601, the actual timestamps for the second through seventeenth wedges are 2000.5, 3000.5, 4001, 5001, 6001, 7001.5, 8001.5, 9001.5, 10001.5, 11002, 12002, 13002, 14002, 15002, 16002 and 17002.

Rows 602 and 603 show how these discrepancies would be treated using a typical DSW technique. As shown on row 602, SSMF for the third, fifth, sixth, eighth, ninth, tenth and twelfth through seventeenth occurred at the expected interval of 1000 time units from the respective previous SSMF. Only for the second, fourth, seventh and eleventh wedges did each SSMF at an interval other than 1000 time units from the respective previous SSMF; in this example, SSMF for each of the second, fourth, seventh and eleventh wedges occurred at 1000.5 time units from the respective previous SSMF, which is a deviation for each of those wedges of 0.5 time units. According to a typical DSW technique, those deviations might be below a threshold of detection so that no corrective action would be taken, allowing errors on subsequent wedges to accumulate to 2 time units from their expected times (not detected at 603 but seen in the New DSW technique at 605).

Figure 7:
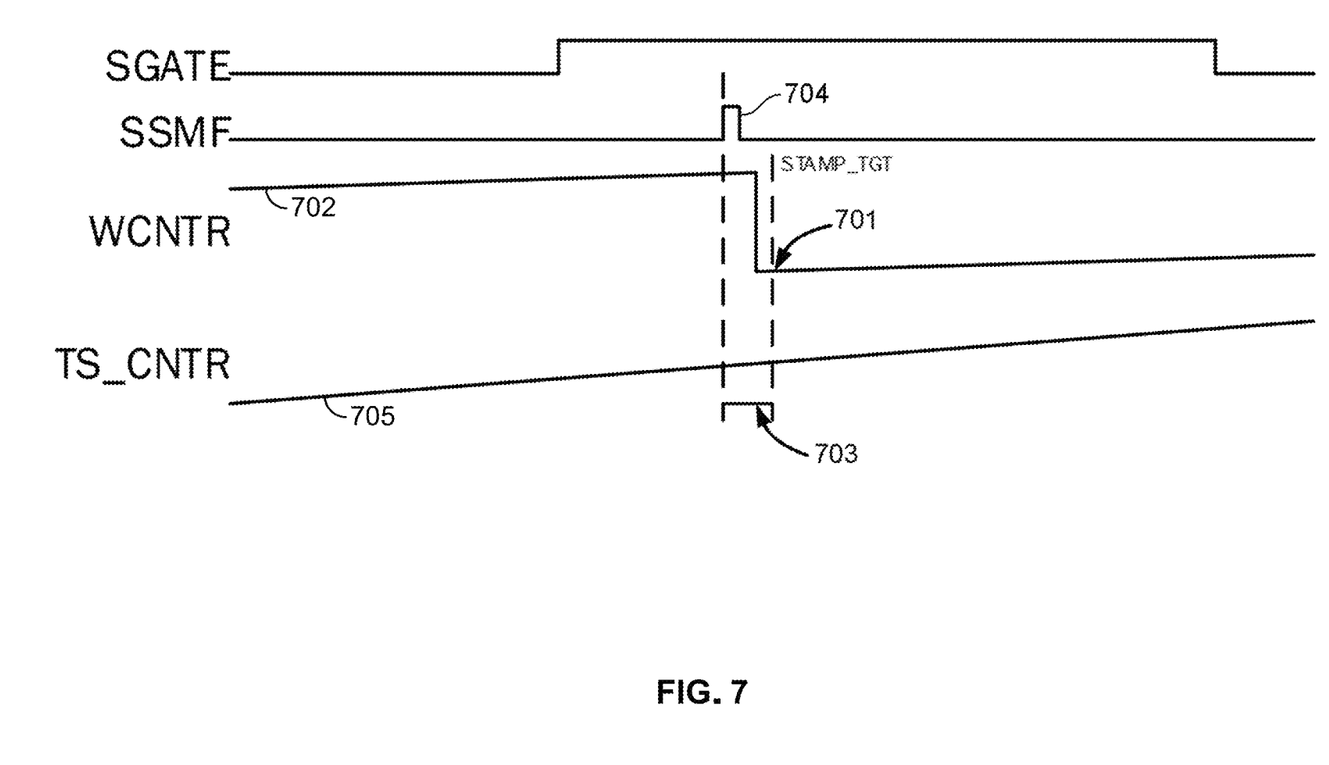
FIG. 7 is a timing diagram illustrating a technique, according to implementations of the subject matter of this disclosure, for monitoring frequency control.

In order to check actual occurrences of SSMF against the WCNTR timer for the technique described in connection with FIG. 6 (or for other DSW techniques), a location on the WCNTR timer "ramp" can be selected at an initial time. As shown in FIG. 7, that location 701 on the timer ramp 702 may be at or near WCNTR=0, but any consistent location can be chosen. The duration of the interval 703 between SSMF 704 and the selected location 701 at the initial time is noted, and then periodically—e.g., on each occurrence of a new servo wedge—the actual duration between SSMF and the selected location is measured using time-stamp counter (TS_CNTR) 705, which is linked to the time base generator. If a change is detected in the actual duration between SSMF and the selected location, the relationship between the time base generator and the disk rotation can be adjusted.

In implementations of the subject matter of this disclosure, the time base generator (e.g., PLL 538; see FIG. 5 above) for the primary surface is locked to the disk rotation as discussed above and then the self-servo-write system is enabled. The time base counters WCNTR and NWCNTR are reset at the first SSMF signal, but then are set to continually run, resetting to zero at each passage of the expected wedge-to-wedge duration, as seen at 801 in timing diagram 800 of FIG. 8. Resets 801 correspond in time to SSMF signals 802 but in many implementations are not caused by SSMF signals 802. Rather, both the expected wedge-to-wedge duration, and the occurrences of SSMF, are based on same physical phenomenon—i.e., the rotational speed of the disk.

Figure 8:
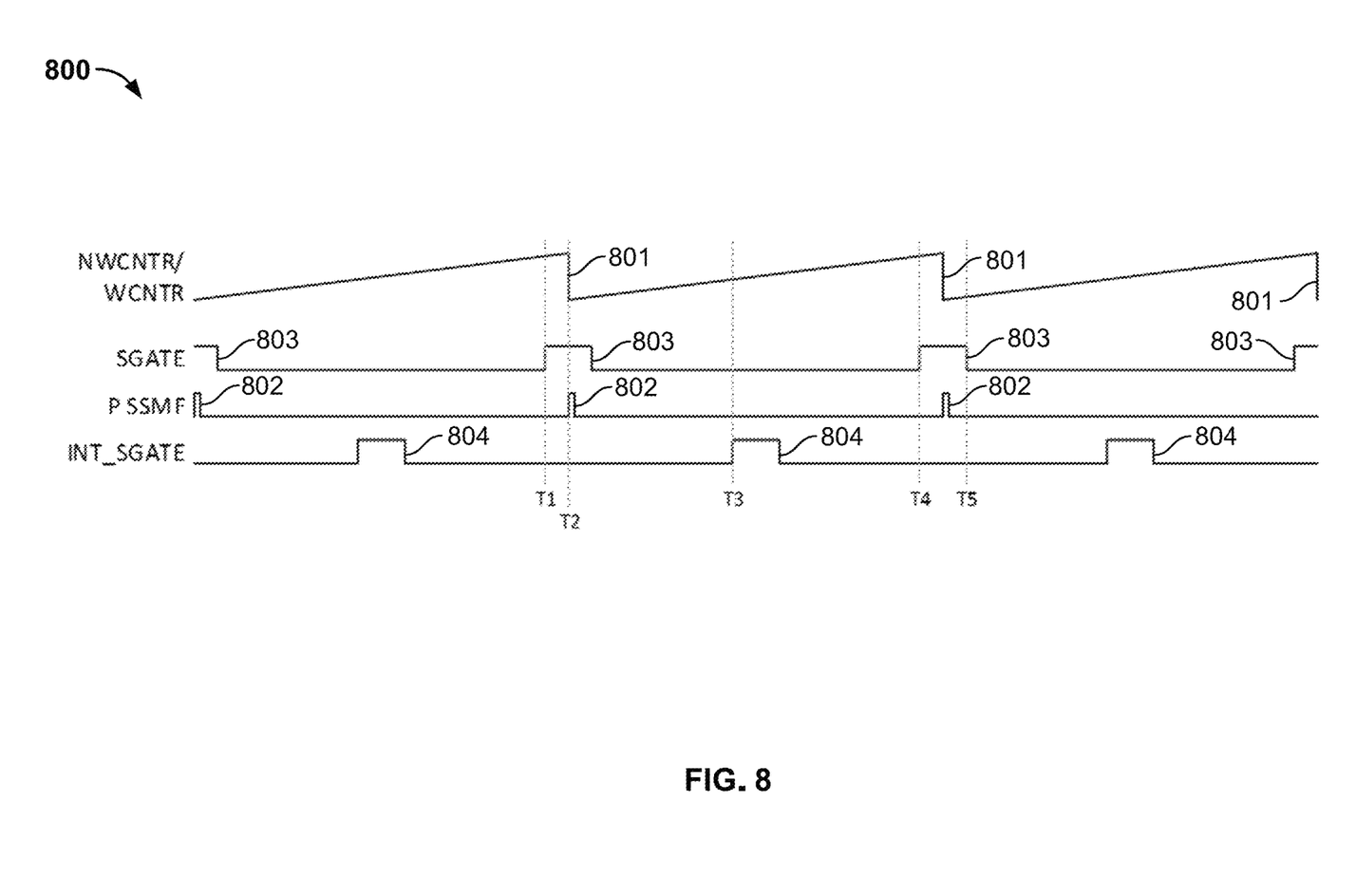
FIG. 8 is a timing diagram showing the reading of servo data to generate RRO data in accordance with implementations of the subject matter of this disclosure.

As seen in timing diagram 800, the hard disk controller issues a read command at time T2, corresponding to SSMF 802 and WCNTR reset 801, to initiate a concentric servo read operation on the primary surface, by asserting SGATE signal 803. Each occurrence of SGATE 803 straddles the occurrence of SSMF 802, beginning at time T1 before occurrence of reset 801/SSMF 802. This is possible because timing diagram 800 represents a steady state after an initial period in which a first SGATE 803 may have occurred after reset 801/SSMF 802. With the expected wedge-to-wedge duration being known, SGATE 803 can begin before reset 801/SSMF 802. At time T3, approximately halfway through the wedge-to-wedge duration, the self-servo-write firmware issues internal SGATE signal 804 to initiate a servo read operation on the secondary surface. Internal SGATE signal 804 need not be precisely halfway between SGATE signals 803. However, halfway is convenient to avoid collisions.

At time T4, before beginning the next cycle of primary surface servo reading, demodulation of the secondary surface read operation initiated at time T3 is completed, followed at time T5 by demodulation of the primary surface read operation initiated at time T1, and the demodulated data is used to calculate positioning/timing data for storing the RRO data for each surface. That positioning/timing data may be stored as part of a write vector in servo memory (SMEM) 568. SMEM 568 may be configured as a circular buffer for storing the write vector.

As previously mentioned, there is only one write data channel. The RRO data to be written is output as signal W0 to both preamplifiers 507, 517. As seen in the timing diagram of FIG. 9, during each cycle 901 of WCNTR 911, as explained above, SGATE 912 is asserted once, and internal SGATE (INT_SGATE) 913 also is asserted once—about halfway between assertions of SGATE 912. To write the RRO data, WGATE signal 903 is asserted once for each surface—i.e., twice for each cycle of WCNTR 911. The position in the servo wedge to which the RRO data is to be written is known, and WCNTR/NWCNTR are monitored so that WGATE signal 903 can be triggered when WCNTR reaches a value that corresponds to that position as demodulated from the servo data as described above.

Figure 9:
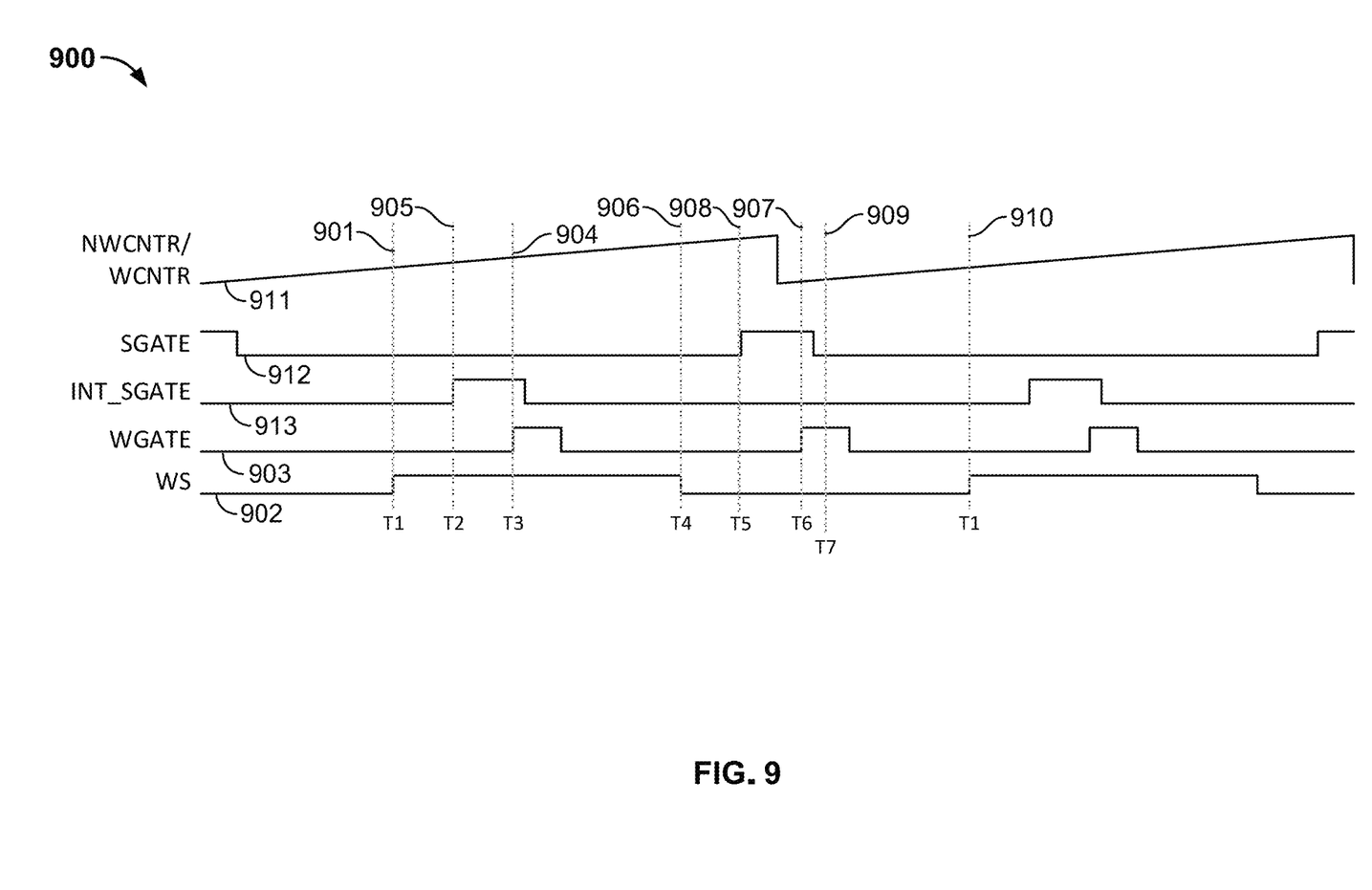
FIG. 9 is a timing diagram showing the timing of write signals in accordance with implementations of the subject matter of this disclosure.

The assertions of WGATE 903 occur just before the end of the respective SGATE 912 or INT_SGATE 913 to which it applies. Whether assertion of WGATE 903 causes writing to the primary surface or the secondary surface is determined by WRITE_SELECT (WS) signal 902. When WS 902 is asserted, WGATE 903 causes writing to the secondary surface, while when WS 902 is de-asserted, WGATE 903 causes writing to the primary surface, thereby alternating or interleaving the writing of RRO data to the primary and secondary surfaces with a single write channel.

Typically, the assertion of WGATE 903 would be handled by the servo interrupt service routine (servo ISR). However, in order to accommodate two assertions of WGATE 903 in each WCNTR cycle, the frequency of servo ISR would have to double, which could be a challenge for the hard drive controller. Accordingly, in implementations of the subject matter of this controller, the fetching, from SMEM 568, of the positioning/timing data for writing the RRO data, is controlled by a hardware SERVO VECTOR FETCH command.

As seen in the timing diagram 900 in FIG. 9, at time T1 901, when WS 902 selects the secondary surface, the SERVO VECTOR FETCH command loads the positioning/timing data for writing the RRO data that is to be subsequently written when WGATE 903 is asserted at time T3 904. At time T2 905, INT_SGATE 913 for the secondary surface is asserted by the SERVO VECTOR FETCH routine. At time T3 904, RRO write for the secondary surface is started, writing the RRO data based on the positioning/timing data that was loaded at time T1 901. At time T4 906, when WS 902 selects the primary surface, the SERVO VECTOR FETCH command loads the positioning/timing data for writing the RRO data that is to be subsequently written when WGATE 903 is asserted at time T6 907. At time T5 908, SGATE 912 for the primary surface is asserted by the hard drive controller. At time T6 907, RRO write for the primary surface is started, writing the RRO data that based on the positioning/timing data was loaded at time T4 906. At time T7 909, triggered by an occurrence of SGATE 912 following completion of an RRO writing cycle, the servo ISR routine starts to process new servo demodulation results to keep the heads on track for the next cycle. The cycle begins again at time T1 910.

Figure 10:
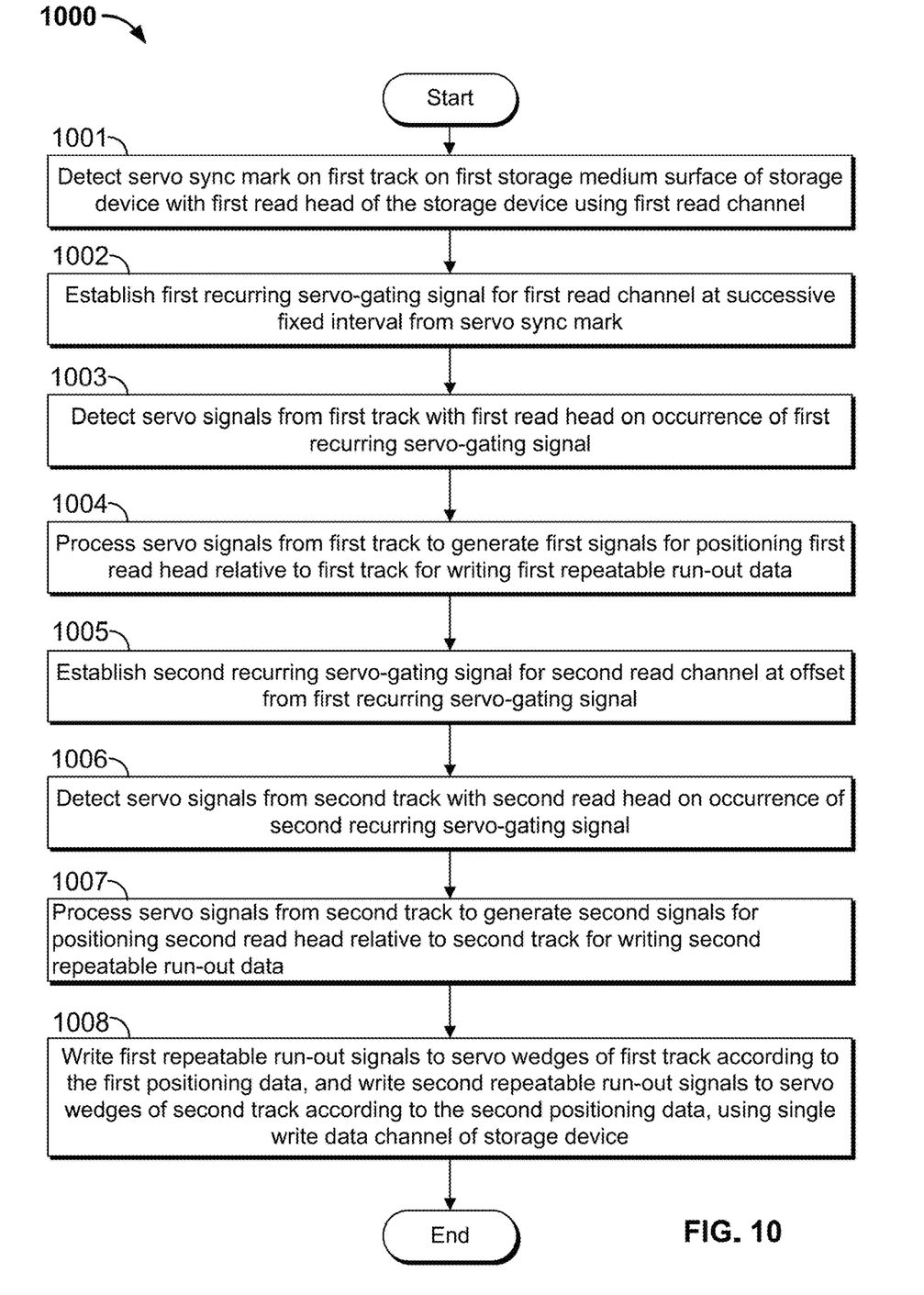
FIG. 10 is a flow diagram illustrating a method according to implementations of the subject matter of this disclosure.

FIG. 10 is a flow diagram illustrating a method 1000 according to implementations of this disclosure for performing RRO write operations on two surfaces of a multi-surface storage device.

At 1001, a servo sync mark on a first track on a first storage medium surface of the storage device is detected with a first read head of the storage device, using a first read channel. At 1002, a first recurring servo-gating signal for the first read channel is established at a successive fixed interval from the servo sync mark. At 1003, servo signals from the first track are detected with the first read head on occurrence of the first recurring servo-gating signal. At 1004, the servo signals from the first track are processed to generate first signals for positioning the first read head relative to the first track for writing first repeatable run-out data. At 1005, a second recurring servo-gating signal for a second read channel is established at an offset from the first recurring servo-gating signal. At 1006, servo signals from a second track are detected with the second read head on occurrence of the second recurring servo-gating signal. At 1007, the servo signals from the second track are processed to generate signals for positioning the second read head relative to the second track for writing second repeatable run-out data. At 1008, the first repeatable run-out data is written to servo wedges of the first track, and the second repeatable run-out data is written to servo wedges of the second track, using a single write data channel of the storage device, and method 1000 ends.

Thus it is seen that a method of performing RRO write operations on two surfaces of a multi-surface storage device, and a multi-surface storage device configured for such a method, have been provided.

As used herein and in the claims which follow, the construction "one of A and B" shall mean "A or B."

It is noted that the foregoing is only illustrative of the principles of the invention, and that the invention can be practiced by other than the described embodiments, which are presented for purposes of illustration and not of limitation, and the present invention is limited only by the claims which follow.

What is claimed is:

1. A method for writing repeatable run-out data, representing a recurring contribution to position error, to multiple surfaces of a rotating magnetic storage medium in a storage device having two read channels, the method comprising:
processing servo signals from a first track on a first storage medium surface of the storage device, to generate first positioning signals for positioning a first read head relative to the first track for writing first repeatable run-out data;
processing servo signals from a second track, to generate second positioning signals for positioning a second read head relative to the second track for writing second repeatable run-out data;
establishing a first recurring servo-gating signal for a first read channel at a successive fixed interval, based on rotation speed of the rotating magnetic storage medium, from an initial servo sync mark; and
writing the first repeatable run-out data to servo wedges of the first track according to the first positioning signals, and the second repeatable run-out data to servo wedges of the second track according to the second positioning signals, using a single write data channel of the storage device.

2. The method of claim 1 wherein:
processing the servo signals from the first track comprises processing the servo signals from the first track in a storage device controller separate from the storage device; and
processing the servo signals from the second track comprises processing the servo signals from the second track in servo writing circuitry of the storage device.

3. The method of claim 2 further comprising storing the first positioning signals and the second positioning signals, prior to the writing, in memory in the servo writing circuitry of the storage device.

4. The method of claim 3 further comprising issuing respective first and second fetch commands from the servo writing circuitry to respectively fetch the first positioning signals and the second positioning signals from the memory.

5. The method of claim 1 wherein writing the first repeatable run-out signals to servo wedges of the first track according to the first positioning signals, and the second repeatable run-out signals to servo wedges of the second track according to the second positioning signals, using a single write data channel of the storage device, comprises temporally interleaving writing the first repeatable run-out signals to servo wedges of the first track with writing the second repeatable run-out signals to servo wedges of the second track.

6. The method of claim 1 further comprising locking the fixed interval to the rotation speed of the rotating magnetic storage medium.

7. The method of claim 6 wherein locking the fixed interval to the rotation speed of the rotating magnetic storage medium comprises:
setting a counter as a timer of the fixed interval;
marking a time difference between a selected position of the counter and the servo sync mark;
periodically checking that the time difference between the selected position of the counter and the servo sync mark has not changed; and
when the time difference between the selected position of the counter and the servo sync mark has changed, adjusting a clock source of the rotating magnetic storage medium.

8. The method of claim 7 wherein periodically checking comprises checking once during each servo wedge.

9. A data storage system comprising:
a storage device; and
a storage controller separate from the storage device; wherein:
the storage device comprises:
a storage medium, having multiple storage medium surfaces on which servo data is written, the servo data on each storage medium surface including a repeatable run-out field representing a recurring contribution to position error; and
circuitry for writing the repeatable run-out field, the circuitry comprising:
a first read channel,
a second read channel,
a first detector on a first read head of the storage device, the first detector being configured to detect data, including a servo sync mark, on a first track on a first storage medium surface of the storage device, and
a second detector on a second read head of the storage device, the second detector being configured to detect data on a second track on a second storage medium surface of the storage device; and
the system is configured to:
process servo signals from the first track, to generate first positioning signals for positioning the first read head relative to the first track for writing first repeatable run-out data,
process servo signals from the second track, to generate second positioning signals for positioning the second read head relative to the second track for writing second repeatable run-out data, and
write the first repeatable run-out data to servo wedges of the first track according to the first positioning signals, and the second repeatable run-out signals to servo wedges of the second track according to the second positioning signals, using a single write data channel of the storage device.

10. The data storage system of claim 9 wherein the system is configured to:
process the servo signals from the first track by processing the servo signals from the first track in a storage device controller separate from the storage device; and
process the servo signals from the second track by processing the servo signals from the second track in servo writing circuitry of the storage device.

11. The data storage system of claim 10 further comprising memory in the servo writing circuitry of the storage device, the memory being configured to store the first positioning signals and the second positioning signals, prior to writing the first positioning signals to servo wedges of the first track and the second positioning signals to servo wedges of the second track.

12. The data storage system of claim 11 wherein the servo writing circuitry is configured to issue respective first and second fetch commands from the servo writing circuitry to respectively fetch the first positioning signals and the second positioning signals from the memory.

13. The data storage system of claim 9 wherein the system is configured to write the first repeatable run-out signals to servo wedges of the first track according to the first positioning data, and the second repeatable run-out signals to servo wedges of the second track according to the second positioning data, using a single write data channel of the storage device, by temporally interleaving writing the first repeatable run-out signals to servo wedges of the first track with writing the second repeatable run-out signals to servo wedges of the second track.

14. The data storage system of claim 9 wherein the system is further configured to establish a first recurring servo-gating signal for a first read channel at a successive fixed interval, based on rotation speed of the rotating magnetic storage medium, from an initial servo sync mark.

15. The data storage system of claim 14 wherein the system is configured to lock the fixed interval to the rotation speed of the rotating magnetic storage medium.

16. The data storage system of claim 15 wherein the system is configured to lock the fixed interval to the rotation speed of the rotating magnetic storage medium by:
   setting a counter as a timer of the fixed interval;
   marking a time difference between a selected position of the counter and the servo sync mark;
   periodically checking that the time difference between the selected position of the counter and the servo sync mark has not changed; and
   when the time difference between the selected position of the counter and the servo sync mark has changed, adjusting a clock source of the rotating magnetic storage medium.

17. The data storage system of claim 16 wherein the system is configured to periodically check that the time difference between the selected position of the counter and the servo sync mark has not changed by checking once during each servo wedge.

* * * * *